(12) United States Patent
Gaertner et al.

(10) Patent No.: US 10,100,696 B2
(45) Date of Patent: Oct. 16, 2018

(54) METHOD FOR OPERATING AN EXHAUST GAS PURIFICATION SYSTEM CONNECTED TO AN INTERNAL COMBUSTION ENGINE OF A MOTOR-VEHICLE COMPRISING AN SCR CATALYST

(71) Applicant: Daimler AG, Stuttgart (DE)

(72) Inventors: Uwe Gaertner, Remshalden (DE); Alexander Massner, Esslingen (DE); Erik Rechtlich, Stuttgart (DE); Frank Zimmermann, Stuttgart (DE)

(73) Assignee: Daimler AG, Stuttgart (DE)

( * ) Notice: Subject to any disclaimer, the term of this patent is extended or adjusted under 35 U.S.C. 154(b) by 197 days.

(21) Appl. No.: 15/128,388

(22) PCT Filed: Feb. 13, 2015

(86) PCT No.: PCT/EP2015/000322
§ 371 (c)(1),
(2) Date: Sep. 22, 2016

(87) PCT Pub. No.: WO2015/144276
PCT Pub. Date: Oct. 1, 2015

(65) Prior Publication Data
US 2018/0171847 A1    Jun. 21, 2018

(30) Foreign Application Priority Data
Mar. 27, 2014 (DE) .................. 10 2014 004 439

(51) Int. Cl.
*F01N 3/20* (2006.01)
*F01N 3/08* (2006.01)
(Continued)

(52) U.S. Cl.
CPC .......... *F01N 3/208* (2013.01); *F01N 3/0222* (2013.01); *F01N 3/0233* (2013.01);
(Continued)

(58) Field of Classification Search
CPC ...... F01N 3/0233; F01N 3/2066; F01N 3/208; F01N 2240/20; F01N 2240/36; F01N 2250/02; F01N 2610/02; F01N 2900/1406
See application file for complete search history.

(56) References Cited

U.S. PATENT DOCUMENTS 5,628,186 A    5/1997  Schmelz
7,587,889 B2   9/2009  Frazier et al.
(Continued)

FOREIGN PATENT DOCUMENTS

DE           43 15 278 A1    11/1994
DE      11 2007 001 626 T5    6/2009
(Continued)

OTHER PUBLICATIONS

PCT/EP2015/000322, International Search Report dated May 6, 2015 (Two (2) pages).
(Continued)

*Primary Examiner* — Audrey K Bradley
(74) *Attorney, Agent, or Firm* — Crowell & Moring LLP

(57) ABSTRACT

A method for operating an exhaust gas purification system connected to an internal combustion engine of a motor vehicle is disclosed. The purification system includes an SCR catalyst for catalyzed reaction of nitrogen oxides contained in the exhaust gas of the internal combustion engine with ammonia. The method includes adding a reducing agent containing ammonia to the exhaust gas upstream of the SCR catalyst at a predeterminable dosage rate and determining a pressure value correlating with an absolute pressure in the exhaust gas purification system on the input side of the SCR catalyst. The dosage rate is specified at least as a function of the pressure value.

6 Claims, 3 Drawing Sheets

(51) Int. Cl.
　　　*F01N 3/022*　　　(2006.01)
　　　*F01N 3/023*　　　(2006.01)

(52) U.S. Cl.
　　　CPC ......... *F01N 3/0814* (2013.01); *F01N 3/0842* (2013.01); *F01N 3/2066* (2013.01); *F01N 2240/20* (2013.01); *F01N 2240/36* (2013.01); *F01N 2250/02* (2013.01); *F01N 2610/02* (2013.01); *F01N 2900/1406* (2013.01)

(56) References Cited

U.S. PATENT DOCUMENTS

| | | |
|---|---|---|
| 8,327,624 B2 | 12/2012 | Kwon |
| 2010/0269491 A1 | 10/2010 | Boorse et al. |
| 2010/0281855 A1 | 11/2010 | Sun et al. |
| 2011/0239628 A1* | 10/2011 | Tanioka .................. F01N 3/208 60/276 |

FOREIGN PATENT DOCUMENTS

| | | |
|---|---|---|
| DE | 10 2008 036 885 A1 | 2/2010 |
| DE | 10 2009 035 304 A1 | 6/2010 |

OTHER PUBLICATIONS

German Search Report issued in German counterpart application No. 10 2014 004 439.4 dated Jun. 16, 2014, with Statement of Relevancy (Eight (8) pages).

\* cited by examiner

METHOD FOR OPERATING AN EXHAUST GAS PURIFICATION SYSTEM CONNECTED TO AN INTERNAL COMBUSTION ENGINE OF A MOTOR-VEHICLE COMPRISING AN SCR CATALYST

BACKGROUND AND SUMMARY OF THE INVENTION

The invention relates to a method for operating an exhaust gas purification system connected to an internal combustion engine of a motor vehicle, comprising a selective catalytic reduction (SCR) catalyst for catalyzed reaction of nitrogen oxides contained in the exhaust gas of the internal combustion engine with ammonia, wherein a reducing agent containing ammonia is added to the exhaust gas upstream of the SCR catalyst at a predeterminable dosage rate.

DE 10 2008 036 88 A1 describes a process in which an exhaust system containing an SCR catalyst is supplied with aqueous urea solution as a reducing agent containing ammonia at a controlled adjustable dosage rate. The dosage rate is set as a function of various variables, so that either a nominal level of ammonia stored in the SCR catalyst predetermined by a computer model or a predetermined nominal efficiency for a nitrogen oxide conversion with ammonia stored in the SCR catalyst and/or fed into the SCR catalyst is at least approximately achieved. In this way, an effective reduction of nitrogen oxides from the exhaust gas of the corresponding motor vehicle internal combustion engine can be achieved.

The object of the invention is to provide a method which allows a further improved removal of nitrogen oxides from a motor vehicle's internal combustion engine exhaust gases.

In the inventive method for operating an exhaust gas purification system connected to a motor vehicle internal combustion engine comprising an SCR catalyst for the catalytic conversion of nitrogen oxides contained in the exhaust gas of an internal combustion engine with ammonia, an ammonia-containing reducing agent is added to the exhaust gas upstream of the SCR catalyst with a predetermined dosage rate, a pressure value correlated to an absolute pressure in the exhaust gas purification system on the inlet side of the SCR catalyst is determined, and the dosage rate is set at least as a function of the pressure value. The dosage rate is different from zero and is preferably set in order that a predetermined target value for a nitrogen oxide conversion or a reduction of nitrogen oxides contained in the exhaust gases is at least approximately achieved. The setting of the dosage rate is preferably controlled by a closed loop with feedback. However, a feed-forward control with an open loop is also possible. With the dosage rate according to the invention, which is dependent from the absolute pressure and in particular set in a controlled way, a further enhanced use of the conversion potential of the SCR catalyst is possible, and therefore a further enhanced reduction of nitrogen oxides from exhaust gases is made possible. The procedure according to the invention takes the findings of the inventors into account, i.e., that the absolute pressure influences particularly mass transfer processes, which, in turn, do also have a significant influence on the catalyzed nitrogen oxide conversion reaction. Among nitrogen oxides, hereinafter simply referred to as NOx, nitric oxide (NO) and nitrogen dioxide ($NO_2$) are primarily considered.

It is particularly advantageous, according to the invention, if a NOx conversion of the SCR catalyst is determined and if it falls below a predetermined threshold for the determined NOx conversion, the absolute pressure in the exhaust gas purification system on the input side of the SCR catalyst is increased by increasing a flow resistance for exhaust gas flowing out of the SCR catalyst. The increase in the absolute pressure at a particular predetermined value on the input side of the SCR catalyst can be effected for example by actuating an exhaust gas retaining flap which is arranged in the flow direction behind the SCR catalyst in the exhaust gas purification system. By increasing the absolute pressure on the input side of the SCR catalyst, the pressure in the catalytic converter element itself is raised. As has been shown, it can thus positively affect the conversion of nitrogen oxides fed with the exhaust gas to the SCR catalyst with ammonia ($NH_3$). The dosage rate can thus optionally be increased and an increased nitrogen oxide conversion can be achieved. Although the causal relationships can be considered as not completely clarified, an improved NOx conversion of the SCR catalyst can be considered as primarily caused by an increased storage capacity of $NH_3$ as well as by a shift in the thermodynamic equilibrium of the conversion reaction.

Preferably, the absolute pressure of the SCR catalyst is increased in connection with a cold start or warm-up of the internal combustion engine. The heating of the SCR catalyst to temperatures at which this has a good NOx reduction activity occurs faster because due to the accumulation of exhaust gas and the correlated throttling effect, from the start hotter exhaust gases are emitted by the engine. If the SCR catalyst has reached a predetermined temperature of ca. 250° C. or a predetermined activity of ca. 70% NOx conversion, the increase of the absolute pressure may be reduced or completely reversed. An increase in absolute pressure has been found to be advantageous also after a warm-up of the internal combustion engine. At an operating temperature of the SCR catalyst at a temperature greater than about 250° C., in particular an increased load on the internal combustion engine with, for example, more than 70% of rated load may cause a relatively high NOx load of the SCR catalyst due to increased untreated NOx emissions. In such operating points a reduction of NOx emissions to specified limit values is often difficult. By increasing the absolute pressure on the input side of the SCR catalyst, an increase of its efficiency is made possible. As a result, even at operating points with high NOx concentrations in the inflowing exhaust gas in the SCR catalyst, high NOx reduction values and compliance with strict limits can be achieved.

In a further embodiment of the invention, it is provided that the increase in the absolute pressure is set as a function of operating variables of the internal combustion engine and/or of the SCR catalyst. Thus it is recognized that an increase in the absolute pressure on the input side of the SCR catalyst or in the SCR catalyst through the exhaust gas purification system has an influence on the internal combustion engine and affects its operation. Optionally there may be undesirable collateral consequences. Also, counterproductive effects on catalyst performance quantities may occur in conjunction with a positive impact on the NOx conversion. By increasing the absolute pressure in dependence on operating variables of the internal combustion engine and/or of the SCR catalyst, this cross-interference can be considered and adverse effects can be minimized or an optimum compromise be found with regard to counter-influenced operating parameters.

In a further embodiment of the invention, the increase in the absolute pressure is adjusted so that the NOx conversion of the SCR catalyst increases at least approximately by a predeterminable extent. For this purpose, it is preferable to resort to previously determined and stored characteristic curves or characteristic fields, which describe the pressure dependence of the NOx conversion of the SCR catalyst as a function of various operating variables. The operating variables may be one or more of the variables: exhaust gas flow rate, catalyst temperature, $NO_2$— or NOx inlet concentration, $NH_3$ slip and optionally other variables.

In a further embodiment of the invention, in parallel with the increase in the absolute pressure, a measure for influencing the exhaust gas temperature is taken on the inlet side of the SCR catalyst. In this way, at least approximately optimum operating conditions for the SCR catalyst with respect to its NOx conversion ability can be set. In particular, at low exhaust gas temperatures, for example 200° C. to 250° C., in parallel to an increase of the absolute pressure, measures to increase the exhaust gas temperature may be adopted. Conversely, for example, in case of exhaust gas temperatures higher than 450° C., measures may be adopted in parallel to an increase in absolute pressure to reduce the exhaust gas temperature. In order to influence the exhaust gas temperature, one or more operating parameters of the internal combustion engine may be modified, such as a change in the timing and/or quantities of fuel pre-, main and/or post-injection, exhaust gas recirculation rate, opening and/or closing times of the internal combustion engine intake and/or exhaust valves.

In a further embodiment of the invention, in order to increase the absolute pressure, a switching is provided of an exhaust gas flow path from a first flow direction in which the exhaust gas of the motor vehicle internal combustion engine before flowing through the SCR catalyst flows through a particulate reduction unit, to a second flow direction, in which exhaust gas from the motor vehicle internal combustion engine before flowing through the particulate reduction unit flows through the SCR catalyst. After switching the exhaust gas flow path, the particulate reduction unit is thus fluidly connected downstream of the SCR catalyst, while being upstream before the switchover. Thus, after switching, escaping exhaust gas from the SCR catalyst has to overcome the flow resistance of the particulate reduction unit prior to being discharged to the environment. The flow resistance of exhaust gas flowing out of the SCR catalyst and the absolute pressure upstream of the SCR catalyst are therefore increased and its NOx conversion capacity is also increased. The switching according to the invention of the exhaust gas flow path turns out to be advantageous, especially at low temperatures at which the SCR catalyst can achieve a NOx conversion rate of less than ca. 50%, especially without additional pressure increase because the particulate reduction unit as an upstream heat sink for the hot exhaust gas of the internal combustion engine is eliminated and the SCR catalyst thus receives hotter exhaust. This is advantageous in particular in case of a warm-up of the internal combustion engine.

When switching the exhaust gas flow path, it is also particularly advantageous when, in a further embodiment of the invention, exhaust gas in the second flow direction flows through the SCR catalyst and the particulate reduction unit in the opposite direction compared to the first direction of flow. By reversing the flow direction in the particles reduction unit a discharge of ash is allowed, which has accumulated in the first flow direction. If, as is preferred, a so-called ammonia barrier catalyst is provided downstream of the SCR catalyst, by switching the exhaust gas flow path in the second direction of flow, exhaust gas preferably flows through the same before flowing through the SCR catalyst. Due to the catalytic oxidation properties of the barrier catalyst it causes an increase of the ratio of NO to $NO_2$ in the exhaust gas. This in turn allows an improvement in the catalytic yield of the SCR catalyst which is in a fluid downstream position in the second flow direction with respect to the barrier catalyst.

Advantageous embodiments of the invention are illustrated in the drawings and are described below. The features mentioned above and features still to be explained may be used not only in the respective feature combinations, but also in other combinations or alone, without departing from the scope of the present invention.

DETAILED DESCRIPTION OF THE DRAWINGS

Figure 1:
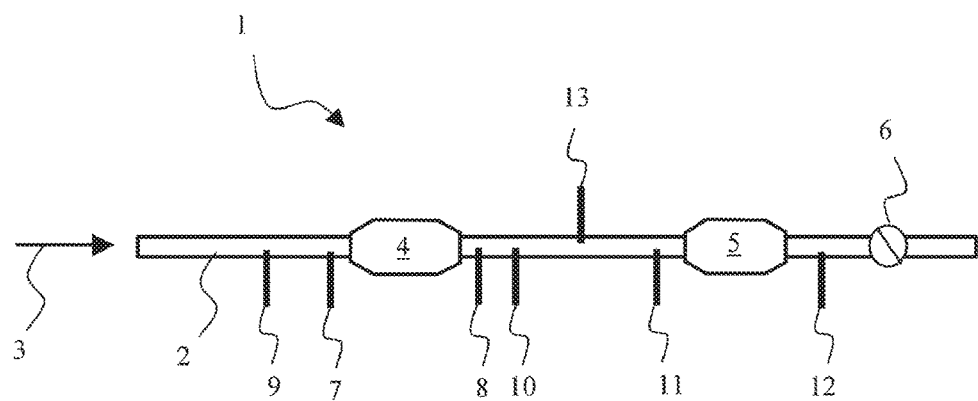
FIG. 1 is a schematic representation of an advantageous embodiment of an exhaust gas purification system, in which the method of the invention can be used.

In FIG. 1, an advantageous embodiment of an exhaust purifying system 1 is merely exemplary and schematically shown, in which the inventive method can be applied. The exhaust gas purification system 1 is in this case associated to a motor vehicle internal combustion engine, not shown, hereinafter referred to as motor. The motor is preferably designed as a direct-injection diesel engine, in particular of a commercial vehicle.

The exhaust gas discharged from the engine is picked up by an exhaust line 2 of the exhaust gas purification system 1 and flows in a direction indicated by an arrow 3 successively through a particulate reduction unit 4 and an SCR catalyst 5. Downstream of the SCR catalyst 5 is the exhaust line 2, in which an exhaust gas retaining flap 6 is arranged, by means of which the exhaust gas is accumulated and thus the pressure of the exhaust gas, in particular upstream of the SCR catalyst 5, may be raised or adjusted. The exhaust gas retaining flap 6 is preferably continuously adjustable between an open position and a closed position. It may be provided that in the closed position a predetermined exhaust gas leakage rate can flow over the exhaust gas retaining flap 6.

On the input and output side of the particulate reduction unit 4 and of the SCR catalyst 5 various sensors are provided for pressure, temperature and various exhaust components. By way of example only a first absolute pressure sensor 7 is shown in FIG. 1 on the input side and a second absolute pressure sensor 8 is provided on the output side of the particulate reduction unit 4. By means of the absolute pressure sensors 7, 8, a differential pressure across the particulate reduction unit 4 and thus a load of particulates filtered out of the exhaust is determined. By means of the absolute pressure sensor 8 a value for the absolute pressure on the input side of the SCR catalyst 5 is preferably also determined. Furthermore, a first temperature sensor 9 is provided before the particulate reduction unit 4 and a second temperature sensor 11 before the SCR catalyst 5. By means of the temperature sensors 9, 11 a temperature of the particulate reduction unit 4 and the SCR catalyst 5 can be determined. Further, a first exhaust gas sensor 10 for NOx and/or NH$_3$ is positioned behind the particulate reduction unit 4 and a second exhaust gas sensor 12 is provided behind the SCR catalyst 5, which are used to determine the NOx and/or NH$_3$ content in the exhaust gas.

Further, an injector 13 is arranged for delivering a NOx-reducing agent into the exhaust gas between the first exhaust gas sensor 10 and the second temperature sensor 11 in the exhaust line 2. The supply of the injector 13 with the reducing agent takes place from a vessel, not shown, from which the reducing agent is supplied by means of a reducing agent pump to the injector 13. Without loss of generality it is assumed below that the reducing agent is an aqueous urea solution. In the hot exhaust gas, the actual effective reducing means NH$_3$ is released by thermolysis and/or hydrolysis of the urea, which acts selectively with respect to the catalytic reduction of NOx in the exhaust gas in the SCR catalyst 5. Accordingly, the SCR catalyst 5 is preferably formed as a solid catalyst based on $V_2O_5/WO_3/TiO_2$ or as coated zeolitic SCR catalyst carrier having a storage capacity with respect to NH$_3$. The SCR catalyst 5 comprises a honeycomb structure having a plurality of parallel flow channels and may comprise two series-connected SCR-catalyst elements.

The particulate reduction unit 4 is preferably made of an oxidation catalyst and a directly downstream connected particulate filter, which is preferably a wall flow through honeycomb body based on silicon carbide or aluminum titanate or Cordierite, wherein the filter walls are preferably at least partially provided with an oxidation catalytic active coating. The oxidation catalyst and the particulate filter are preferably closely adjacent arranged in a common housing.

It is understood that the exhaust purification system 1 of FIG. 1 has or may have further sensors, exhaust gas cleaning components and other components, which are not shown for sake of clarity. For example, additional temperature and pressure sensors, as well as other exhaust gas sensor sensitive to NOx, oxygen, or other exhaust gas components may be provided upstream, or downstream of the particulate reduction unit 4 and/or the SCR catalyst 5, or between the oxidation catalyst and the particulate filter of the particulate reduction unit 4. Further, a mixing unit for the preparation of the added urea solution between the injector 13 and the SCR catalyst 5 and a NH$_3$-blocking catalyst may be arranged behind the SCR catalyst 5. Preferably also a dosing unit for fuel upstream of the particulate reduction unit 4 is provided. The engine preferably has chargers, exhaust gas recirculation units and fuel injectors. In the exhaust line 2 additional purification components, devices for adding further additives and other sensors and the like may be provided.

Sensors and actuators of the exhaust gas purification system and of the engine are connected to an electronic control unit which is able to evaluate detected operating variables and process, and from this to generate and deliver control signals for controlling the exhaust gas purification system 1 and the motor. Hereinafter, reference is made to an advantageous embodiment of such a control unit, which is only schematically shown in FIG. 2. It is understood that differently configured control device architectures can be used to control the engine and exhaust gas purification system 1.

Figure 2:
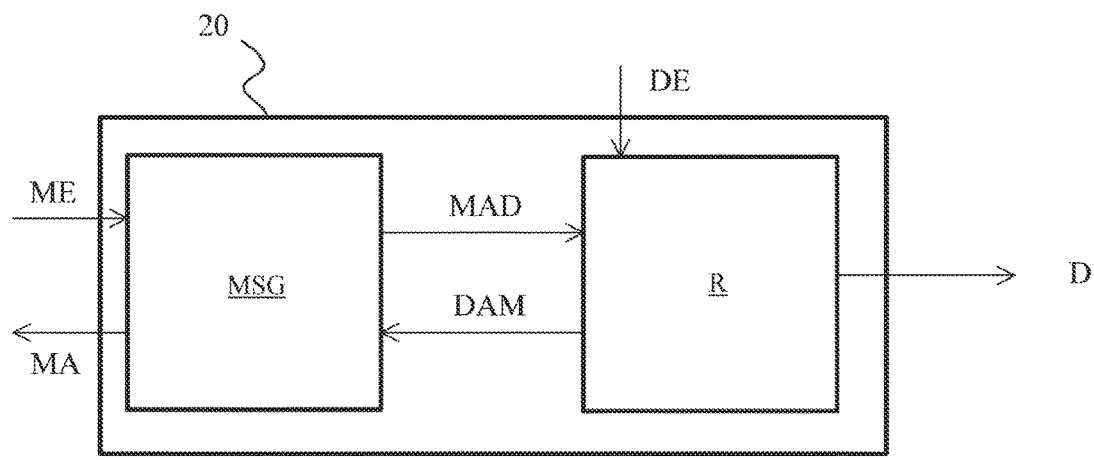
FIG. 2 is a schematic representation of a control unit for determining a dosage rate for the reducing agent to be supplied to the exhaust gas.

The exemplary embodiment of an electronic control unit 20 in FIG. 2, inter alia, uses a model-based determination of a dosage rate D reducing agent to be supplied to the exhaust gas via the injector 13. The control unit 20 has for this purpose a motor control device MSG and a computing unit R with a calculated dosage model stored therein. The engine control unit MSG receives input variables ME, which essentially refer to engine operation. These presently include current values for the engine speed n, the exhaust gas recirculation rate EGR, the air intake mass $m_L$ as well as further, not specifically mentioned engine operating variables. On the other hand, the engine control unit MSG output variables MA for controlling the engine operation. The outputs of MA include here an engine torque M, start times $t_{ASB}$, and end times $t_{ASE}$ for fuel injectors of the engine, fuel injection quantities, a control signal KL for controlling the exhaust gas retaining flap 6 and further control variables, not mentioned in detail.

The engine control unit MSG communicates with the computing unit R and transmits values MAD and receives values DAM from the arithmetic unit R. The data MAD transferred to the computing unit R comprise presently received or calculated values for a current absolute pressure p on the input side of the SCR catalyst 5, a maximum permissible absolute pressure $p_{max}$ and in particular adjustable by means of the exhaust gas retaining flap 6 on the input side of the SCR catalyst 5, an exhaust gas mass flow $m_A$ and further operating variables, in particular of the exhaust gas purification system 1. In determining the maximum allowable absolute pressure $p_{max}$ it is preferable to comply with prescribed conditions, in particular for engine operation such as fuel consumption, soot emissions, torque dynamics and optionally other variables.

The values DAM received by the motor control device MSG from the computing unit R include herein a value $p_{nom}$ for an absolute pressure p to be set in particular by means of the exhaust gas retaining flap 6 on the input side of the SCR catalyst 5 and an optionally adjusted temperature increase $\Delta T$ for one of the exhaust gas post-treatment components of the exhaust gas purification system 1.

The computing unit R receives as further input variables DE values determined by measurements or calculation of operating variables, in particular of the exhaust gas purification system 1, such as values for concentrations of nitrogen oxides in the exhaust gases $c_{NO}$, $c_{NO2}$ on the input side of the SCR catalyst 5, $c_{NOx}$, on the inlet and outlet sides of the SCR catalyst 5, an NH$_3$, concentration $C_{NH3}$ on the output side of the SCR catalyst 5 and a temperature T of the SCR catalyst 5. From the received input variables MAD, DE the dosage model of the computing unit R determines a dosage rate D to be adjusted for the amount of the reducing agent to be added and emits these for control of reducing agent injector 13.

To determine the dosage rate D, the dosage model uses different stored characteristic curves and maps that describe the behavior of the SCR catalyst 5 as a function of operating variables influencing the NOx conversion. The characteristic curves or characteristic maps may be both pre-determined and stored as such, hut they can also be dynamically generated or adapted during operation.

Figure 3:
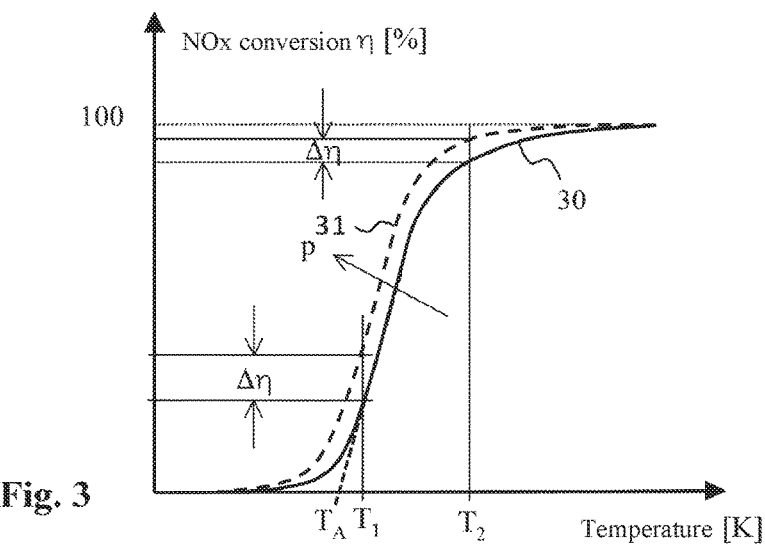
FIG. 3 is a schematic diagram of a NOx conversion of an SCR catalyst as a function of temperature and pressure.

Below, with reference to FIG. 3, a presently particularly interesting characteristic curve concerning a temperature and pressure dependence of the NOx conversion performance of the SCR catalyst 5 is discussed in more detail. In the diagram of FIG. 3, a first typical curve is shown schematically for a NOx conversion η of an SCR catalyst as a function of the catalyst temperature T as a first solid curve 30. It is assumed that the SCR catalyst is supplied with NH$_3$ in a sufficient, but at least a stoichiometric amount. As shown, the NOx conversion η increases steadily, starting from low values with increasing temperature T. At higher temperatures of about 300° C. or more, typically high yields η of at least approximately 100% may be achieved. Below a so-called light-off temperature $T_A$, the achievable conversions η are low to negligible. The light-off temperature $T_A$ may be defined, for example, by the intersection of a tangent applied to the conversion curve 30 with the temperature axis.

As the inventors have seen, in wide temperature ranges an increase in NOx conversion η is possible if the absolute pressure p of the gas contained in the SCR catalyst is increased. In FIG. 3 is shown by way of example a compound obtained by increasing the absolute pressure p and a second dashed curve 31 at otherwise substantially unchanged conditions. The second curve obtained with a pressure increase 31 typically provides approximately a shift of the first conversion curve 30 at lower pressures. As shown in the diagram of FIG. 3, by pressure increase, both at a comparatively high temperature $T_2$, at which a comparatively high NOx conversion can be achieved η, as well as at a comparatively low temperature close to the light-off temperature $T_A$, a marked increase Δη of NOx conversion may be achieved. As can be seen, an increase in pressure also allows for a decrease in the light-off temperature $T_A$.

It is therefore provided according to the invention, to achieve an increase of absolute pressure p in the exhaust gas purification system 1 upstream of the SCR catalyst 5 by adjusting or closing the exhaust gas retaining flap 6 to a greater or lesser extent, and thus to increase the NOx conversion η of the SCR catalyst 5 or to achieve a reduction of its light-off temperature $T_A$.

A determination of whether, and if so to what extent an increase in pressure is to be adjusted, or whether and to what extent a pressure increase should be reversed, takes place in dosage model of the computing unit R. A dosage rate D to be set upstream of the catalyst 5 is determined in parallel depending on the absolute pressure.

Figure 4:
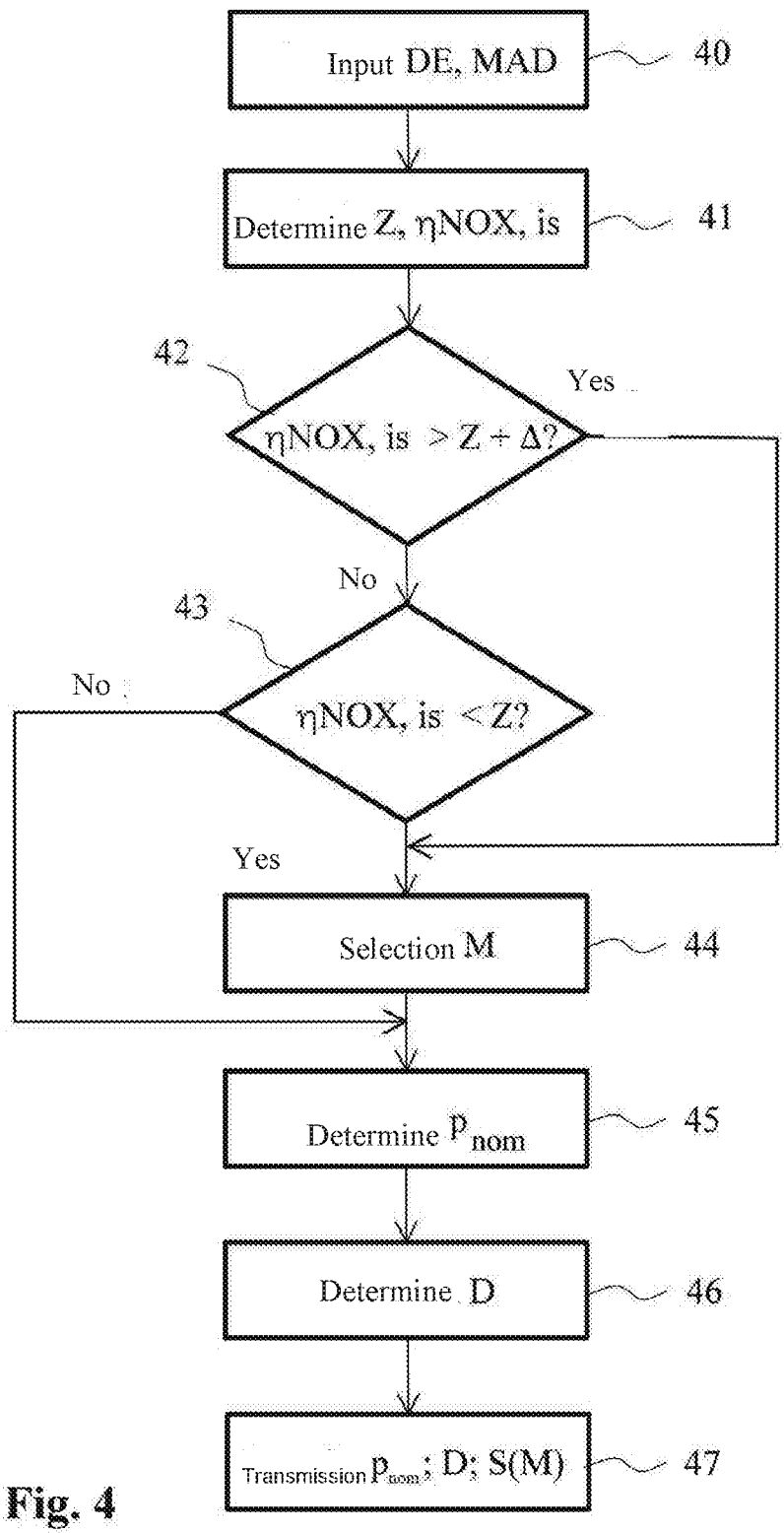
FIG. 4 is a flowchart for explaining the operation of the control unit shown in FIG. 2.

A preferred operation of the dosage model is shown very schematically in the form of a flow chart in FIG. 4. The flowchart is thereby traversed periodically with a predetermined frequency. After reading the input variables DE, MAD in block 40 the dosage model determines a nominal value Z and an actual current value for NOx conversion $\eta_{eff}$ of the SCR catalyst in block 41. The nominal value Z is preferably within predetermined allowable limits for NOx—tailpipe emissions. Predetermined boundary conditions, where appropriate, may also be considered, like $NH_3$ slip, reducing agent consumption and other variables. In order to obtain a possible realistic and achievable nominal value Z, the dosage model preferably also accesses stored characteristics concerning temperature, exhaust gas flow-, pressure and NOx concentrations dependency of the NOx conversion capability of the SCR catalyst 5 and optionally further variables influencing the conversion performance of the SCR catalyst 5. The current NOx conversion is then compared in the blocks 42 and 43 with the nominal value Z.

If it is determined in block 42 that the current NOx conversion exceeds the nominal value Z by more than a predefinable degree Δ, then a jump to block 44 takes place, in which from a plurality of measures M one or more actions are chosen, with which the current NOx conversion can be repositioned as near as possible to the nominal value Z.

If the current NOx conversion does not exceed the nominal value Z by more than a predefinable degree Δ, the dosage model proceeds to query block 43 and it is determined whether the current NOx conversion $\eta_{eff}$ is smaller than the nominal value Z. If this is the case, then the program continues in aforementioned block 44 and it is also determined by which of the measures M, the nominal value Z can be achieved best.

When the block 44 is reached from block 42, for example, a reduction in the dosage rate D, an increase in the NOx raw emission of the engine with a concomitant reduction in fuel consumption, an opening of the exhaust gas retaining flap 6 or a reduction in the absolute pressure p on the input side the SCR catalyst 5 may be provided as measures M. If, however, block 44 is reached, starting from block 43, it is determined whether the nominal value Z may be reached by increasing the absolute pressure p on the input side of the SCR catalyst 5, or by a different, possibly preferable measure M, such as an increase in the dosage rate D, an exhaust gas temperature increase, a reduction in untreated NOx emissions or any other measure M. To determine the influence of pressure on the NOx conversion η, the dosage model uses the characteristic curve shown schematically in FIG. 3 or corresponding table values. Preferably, a prioritization is intended for possible measures M. The prioritization preferably occurs primarily in relation to a lowest possible fuel consumption.

It is envisaged that as shown the selection block 44 is skipped if the current NOx conversion $\eta_{eff}$ is greater than the nominal value Z by less than the envisaged tolerance Δ.

In any case, the dosage model proceeds to block 45, in which a nominal value $p_{nom}$ for the absolute pressure P is determined. If the nominal value to be set lies above the maximum permissible absolute pressure $p_{max}$, the latter is to be set as nominal value $p_{nom}$.

In the following block 46, the dosage model determines, depending on the input variables DE, MAD, of the previously determined reference value $p_{nom}$ for the absolute pressure p and, optionally, further measures M selected in block 44 influencing the NOx conversion η, an NOx conversion η associated to one of these data, which, ideally corresponds to the nominal value Z and ultimately an associated dosage rate D.

In the final output block 47, the determined output variables $p_{nom}$, D, and control signals designated as S (M), generated as a function of the selected measures M, are transmitted to the intended units for processing.

Additionally or alternatively to an increase in the absolute pressure on the input side of the SCR catalyst 5 by actuating the retaining flap 6 as shown in FIG. 1, it can be inventively provided, to increase the absolute pressure by switching the exhaust gas flow path in the exhaust gas purification system 1 from a first flow direction, in which the exhaust gas of the engine prior to passing through the SCR catalyst 5 flows through the particulate reduction unit 4 to a second flow direction, in which exhaust gas of the engine flows through the SCR catalyst 5 before passing through the particulate reduction unit 4.

Figure 5:
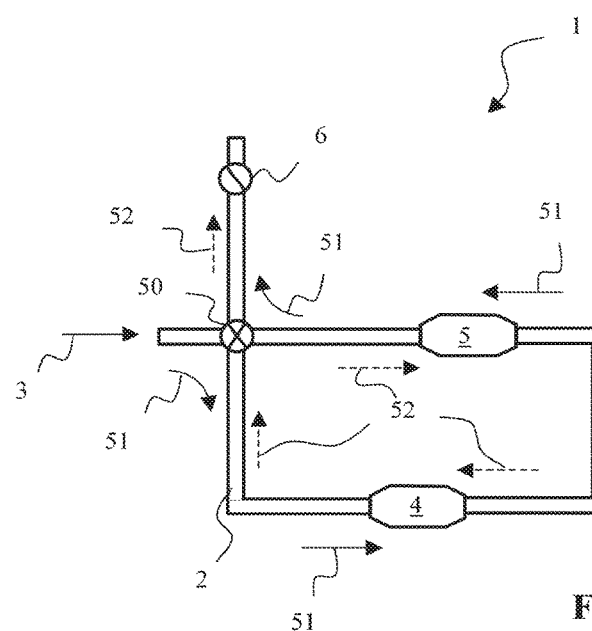
FIG. 5 is a schematic representation of a further advantageous embodiment of an exhaust gas purification system in which the inventive method can be used.

A preferred embodiment of the exhaust gas purifying system 1 is shown schematically in FIG. 5. The same reference numerals are used with respect to FIG. 1 components. Sensors are omitted for reasons of clarity. It is understood, however, that, similar to FIG. 1, in the exhaust gas purifying system 1 shown in FIG. 5, corresponding sensors for detecting the relevant operating parameters of the exhaust gas purification system 1 may be provided.

Compared to the embodiment shown in FIG. 1, a guide of the exhaust line 2 is changed and additionally an exhaust gas flow path switching device 50 is provided. The exhaust gas flow path switching device 50 may be provided as one or more suitably executed valves or valve devices. In any event, the switching device 50 allows a switching of the exhaust gas flow path in the exhaust gas purifying system 1 from a first flow direction in which exhaust gas of the engine flows through the particulate reduction unit 4 before passing through the SCR catalyst 5, to a second flow direction, in which exhaust gas of the engine before flowing through the particulate reduction unit 4 flows through the SCR catalyst 5. The first flow direction is indicated by solid arrows 51, the second flow direction by dashed arrows 52. As can be seen, the particulate reduction unit 4 and the SCR catalyst 5 are traversed in the opposite direction compared to the first exhaust gas flow direction.

Since, typically, the exhaust gas flow resistance of the particulate reduction unit 4 is significantly higher than that of the SCR catalyst 5, in case of switching of the exhaust gas flow path from the first flow direction to the second flow direction an increase of the absolute pressure on the exhaust gas inlet side of the SCR catalyst 5 or in the same takes place.

With regard to carrying out the switching from the first flow direction to the second flow direction or from the second flow direction back in the first flow direction, the dosage model of the computing unit R decides to what extent a respective switching is appropriate or should take place. The action of switching the exhaust gas flow path is expedient part of catalog of measures M in selection block 44 of dosage model outlined in FIG. 4. When deciding on a switch from the first exhaust gas flow direction to the second exhaust gas flow direction also a particle loading of the particulate reduction unit 4, or its effect on the flow resistance of the particulate reduction unit 4, is considered. In other words, a switching of the exhaust gas flow path in response to a differential pressure across the particulate reduction unit 4 is performed.

The invention claimed is:

1. A method for operating an exhaust gas purification system connected to a motor vehicle internal combustion engine, wherein the exhaust gas purification system includes a selective catalytic reduction (SCR) catalyst for catalyzed conversion of nitrogen oxides contained in exhaust gas of the motor vehicle internal combustion engine with ammonia, comprising the steps of:
   adding an ammonia-containing reducing agent to the exhaust gas upstream of the SCR catalyst with a predeterminable dosage rate;
   determining a pressure value correlating with an absolute pressure in the exhaust gas purification system on an input side of the SCR catalyst;
   determining the dosage rate at least as a function of the pressure value;
   determining a nitrogen oxide conversion of the SCR catalyst;
   determining that the nitrogen oxide conversion falls below a predetermined threshold for the determined nitrogen oxide conversion; and
   increasing the absolute pressure in the exhaust gas purification system on the input side of the SCR catalyst in response to determining that the nitrogen oxide conversion falls below the predetermined threshold for the determined nitrogen oxide conversion by increasing a flow resistance for exhaust gas flowing from the SCR catalyst.

2. The method according to claim 1, wherein an increase of the absolute pressure is set as a function of operating variables of the motor vehicle internal combustion engine and/or of the SCR catalyst.

3. The method according to claim 1, wherein an increase of the absolute pressure is set such that the nitrogen oxide conversion increases at least to a predeterminable extent.

4. The method according to claim 1, wherein parallel to the increasing of the absolute pressure, a step of executing a measure for influencing an exhaust gas temperature on the input side of the SCR catalyst is performed.

5. The method according to claim 1, wherein the step of increasing the absolute pressure includes switching of an exhaust gas flow path from a first flow direction, in which the exhaust gas, before passing through the SCR catalyst, flows through a particulate reduction unit, to a second flow direction, in which the exhaust gas, before passing through the particulate reduction unit, flows through the SCR catalyst.

6. The method according to claim 5, wherein in the second flow direction, the exhaust gas flows through the SCR catalyst and the particulate reduction unit in an opposite direction with respect to the first flow direction.

* * * * *